United States Patent [19]

Dube et al.

[11] Patent Number: 4,471,722
[45] Date of Patent: Sep. 18, 1984

[54] WATERING CUP

[75] Inventors: Maurice T. Dube; Michael W. Hart; Warren H. Hart, all of Glendale, Calif.

[73] Assignee: H. W. Hart Mfg. Co., Glendale, Calif.

[21] Appl. No.: 451,779

[22] Filed: Dec. 21, 1982

[51] Int. Cl.³ .............................................. A01K 39/02
[52] U.S. Cl. ...................................................... 119/75
[58] Field of Search ................................. 119/72.5, 75

[56] References Cited

U.S. PATENT DOCUMENTS

| | | | |
|---|---|---|---|
| 2,476,876 | 7/1949 | Klinzing | 119/75 |
| 2,845,046 | 7/1958 | Hart | 119/75 |
| 3,353,518 | 11/1967 | Hart | 119/75 |
| 3,870,022 | 3/1975 | Hart | 119/75 |
| 3,983,844 | 10/1976 | Hart | 119/75 |

Primary Examiner—Gene Mancene
Assistant Examiner—Kris R. Schulze
Attorney, Agent, or Firm—Ellsworth R. Roston; Charles H. Schwartz

[57] ABSTRACT

A valve disposed in a cup is operative between a normally closed position and an open position in accordance with the triggering of a triggering arm pivotally operated in the cup by fowl. The watering cup is formed from a body portion and a clamping member coupled to a pipe at one end for supplying water to the cup. The clamping member has fingers at the other end for retention by the body portion. A pivot pin is disposed on the rim of the body portion and pivotably supports the triggering arm. A rocker arm is also pivotable with the pin at a position internal to the body portion of the cup and adjacent to the inner wall of the cup. The pivotal movement of the rocker and triggering arms is limited in one direction by raised portions or detents on the inner wall of the cup. A gutter extends downwardly and outwardly from a position near the top of the cup to define a channel for directing from the cup water overflowing from the cup. The gutter includes at least one rib in the gutter for controlling the flow of water along the channel. A tongue extends downwardly from the outer end of the gutter to inhibit the water from being directed toward the cup after it flows from the channel.

9 Claims, 7 Drawing Figures

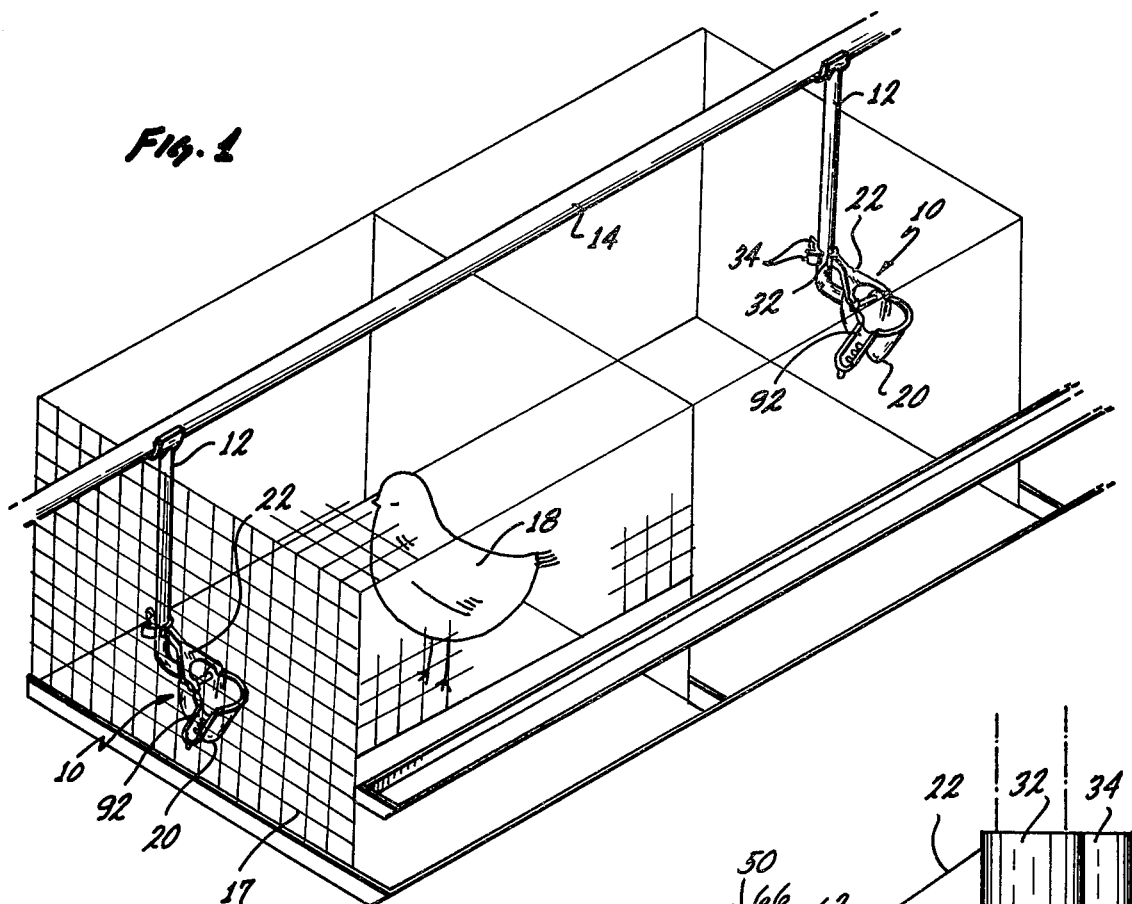
Fig. 1
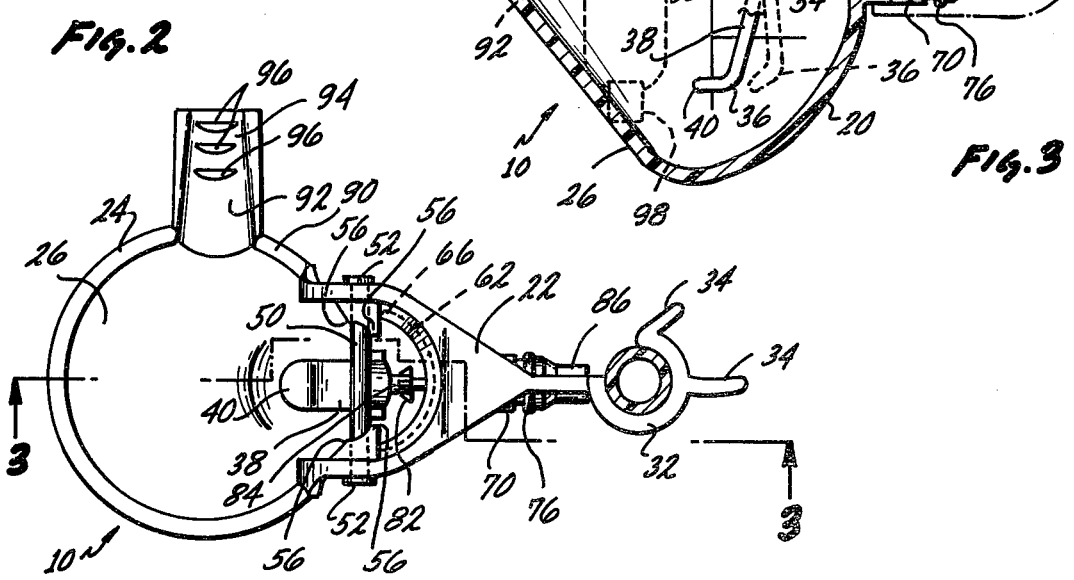
Fig. 2
Fig. 3

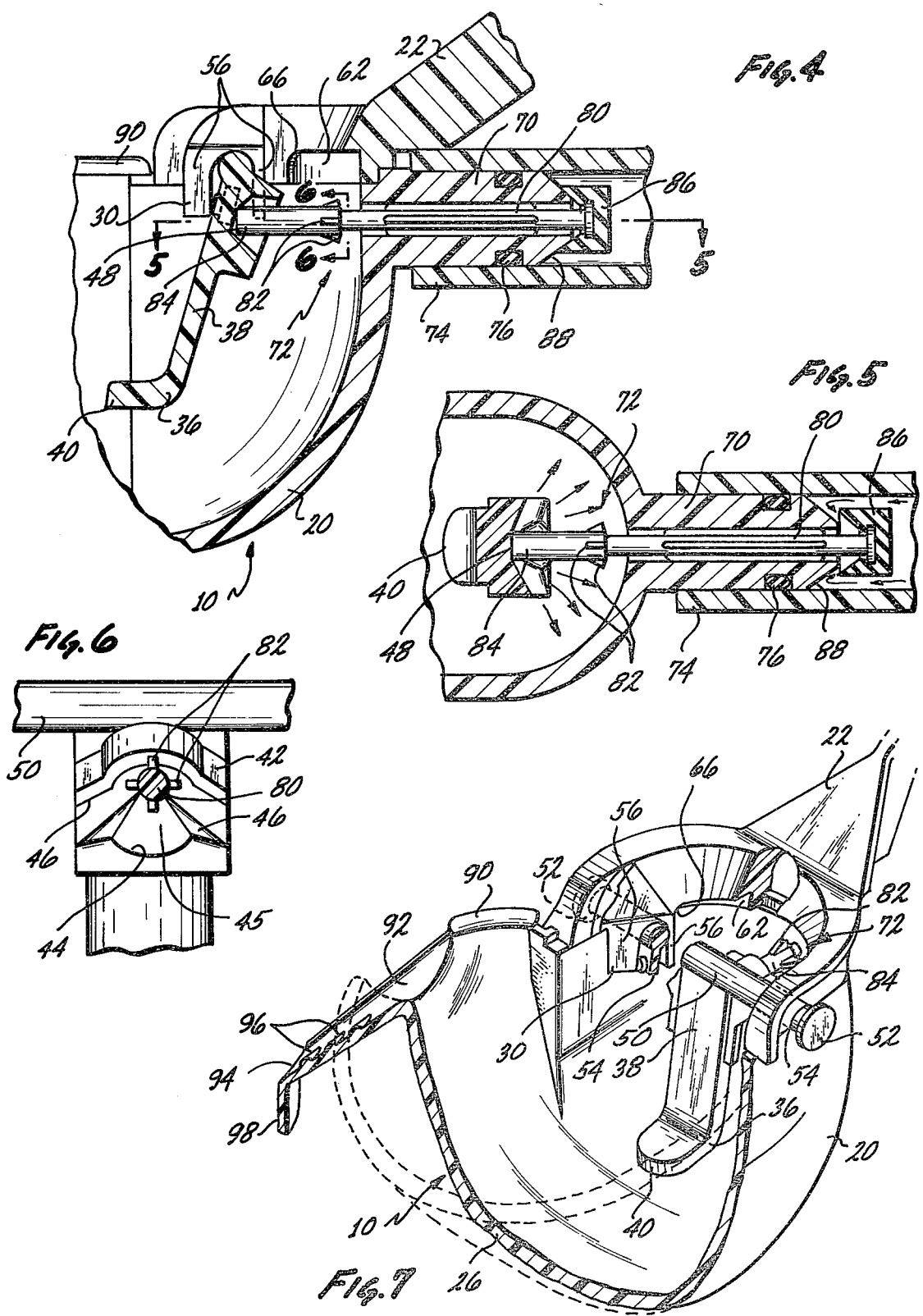

WATERING CUP

This invention relates to watering cups for fowl and more particularly relates to watering cups for providing for a watering of fowl without any clogging of the water cups by particles of dirt or feed.

Fowl, and particularly chickens, have become a staple food throughout the world because they are an excellent source of nutrition and because they can be raised inexpensively and expeditiously. In order to raise the fowl properly, water has to be made available to the fowl whenever the fowl wish to dissipate their thirst.

Various articles have been provided for making water available to fowl. Some of these articles have comprised drinking cups which have included arms actuatable by the beaks of the fowl to open a valve for introducing water into the cups. These cups have generally been successful in making water available to the fowl. However, the fowl have tended to carry particles of dirt and feed on their beaks and to transfer these particles into the cups. Such particles of dirt and feed have sometimes caused the valves to become stuck and have occasionally prevented the walls of the cups from being as clean as might otherwise be desired. This has occasionally produced a spillover of water from the cup. Such water spillover has not been conducive to optimal sanitary conditions and has not made for happy fowl, particularly when the water spillover has occurred in areas adjacent to the fowl. The watering cups have also tended to leak. This has created unsanitary conditions similar to those resulting from water spillover.

Watering cups have been used successfully for decades to provide water to fowl. During that extended period of time, considerable efforts have been made to eliminate the problems discussed in the previous paragraphs. Despite such efforts, the problems discussed above have persisted.

Copending application Ser. No. 401,136 filed by us on July 23, 1982, and assigned of record to the assignee of record of this application discloses and claims a watering cup which eliminates at least some of the above difficulties. The cup is constructed to prevent a valve in the cup from becoming stuck in the open position by particles of dirt or feed. The cup is also constructed so that the surface of the cup adjacent the valve is cleansed of particles of dirt or feed by the flow of water through the valve. The cup is further constructed so that overflow of water from the cup is inhibited.

This application discloses and claims a watering cup which enhances the advantages obtained from the watering cup of application Ser. No. 401,136. For example, the watering cup of this invention prevents water from leaking from the cup. The watering cup of this invention also prevents water overflowing the cup from wetting the ground near the cup.

The watering cup of this invention is shaped to direct water downwardly into the cup in a swirling motion. A triggering arm is mounted on the cup for pivotal movement in accordance with the operation of the arm by the fowl. Valve means are disposed in the cup and are operative between a normally closed position and an open position in accordance with the triggering of the triggering arm by the fowl.

The watering cup is formed from a body portion and a clamping member. The clamping member may be constructed at one end to be coupled to a pipe for supplying water to the cup. The clamping member is provided at the other end with fingers for engaging the body portion to be retained by the body portion at the opposite lateral ends of the body portion.

A pivot pin extends through the clamping member for disposition on the rim of the body portion and supports the triggering arm for pivotal movement. A rocker arm is also pivotable with the pin at one end of the pin at a position internal to the body portion of the cup and adjacent to the inner wall of the cup. The pin may be provided with a head at a position external to the cup and adjacent to the outer wall of the cup. The pivotal movement of the rocker and triggering arms is limited in one direction by raised portions or detents on the inner wall of the cup. The pin, the head, the rocker arm and the triggering arm may be made from a suitable material, such as polypropylene, having properties of floating in water.

Gutter means extend downwardly and outwardly from the top of the cup. The gutter means are shaped to define a channel for directing from the cup water overflowing from the top of the cup. The gutter means include at least one rib on the bottom of the channel for controlling the flow of water along the channel to inhibit the water from being directed toward the cup after it flows from the channel. A tongue extends downwardly from the outer end of the gutter means to inhibit the water from being directed toward the cup after it flows from the channel.

In the drawings:

FIG. 1 is a schematic perspective view of a pen for chicks and of watering cups and of piping for introducing water to the cups;

FIG. 2 is a top plan view of one of the watering cups shown in FIG. 1;

FIG. 3 is an sectional view of the watering cup shown in FIG. 2 and is taken substantially on the line 3—3 of Figure;

FIG. 4 is an enlarged fragmentary sectional view of the cup and is taken substantially on the line 4—4 of FIG. 3;

FIG. 5 is sectional view and is taken substantially on the line 5—5 of FIG. 4; the construction of a pivotable triggering arm and a valve, shown in the closed position, actuatable by the pivotal movement of the arm for providing for the flow of water into the cup;

FIG. 6 is an enlarged fragmentary sectional view and is taken substantially on the line 6—6 of FIG. 4; and FIG. 7 is an enlarged fragmentary perspective view of cup with certain parts broken away to show other parts with additional clarity.

In one embodiment of the invention, a cup generally indicated at 10 is supported on a pipe 12 for providing a controlled introduction of water into the cup. The pipe 12 in turn communicates with a line 14 for receiving water from a source (not shown). The cup 10 is disposed within a pen 17 holding chicks 18 or other fowl.

The cup 10 includes a body portion 20 and a clamping member 22 made from a suitable material such as polypropylene. The body portion 20 is closed at the bottom and is open at the top, the opening being defined by a rim 24. The forward end of the body portion 20 is tapered to define a basin portion 26 for holding water. The tapering of the forward end enhances the ability of the chicks 18 to direct their beaks into the basin 26.

The clamping member 22 is disposed on the rim 24 of the body portion 20 and is clamped to the body portion by fingers 30 which extend downwardly along the body portion at the opposite lateral extremities of the body portion. The clamping member 22 may also be heat sealed to the rim 24 of the body portion 20. At its opposite end, the clamping member 22 is provided with a portion 32 which is constructed to partially encircle and to engage the pipe 12. The encircling portion 32 may be enlarged by manually gripping and operating tab portions 34 so as to facilitate the disposition of the clamping member on the pipe or the removal of the clamping member from the pipe.

A triggering arm 36 is pivotably disposed in the cup 10. The triggering arm 36 may be made from a suitable plastic material such as a polypropylene. Polypropylene is advantageous because it has the properties of floating in water. The triggering arm 36 has a lever arm 38 extending downwardly into the cup in a substantially vertical direction. The lever arm 38 is relatively long so as to increase the tongue arm when a chick operates the arm. The triggering arm 36 also has a tongue portion 40 at the bottom end of the lever arm 38. The tongue portion 40 extends forwardly in a transverse direction, preferably substantially perpendicular, to the lever arm 38 so that it is disposed at a position above the bottom of the basin portion 26. When the chick 18 desires water and the water level in the basin 26 is relatively low, the chick pecks at the tongue portion 40.

Hood portions 42 (FIG. 6) are provided at the rear end of the triggering arm 36 at a position near the upper end of the lever arm 38. The hood portions 42 have a converging arcuate configuration 44 at their central portion to define a central recess 45 for receiving a stream of water. The hood portions 42 also define outwardly and downwardly directed channels 46 at their peripheries. The channels 46 communicate with the recess 45. The center of the recess 45 may be further indented as at 48.

A pin 50 (FIG. 7) made from a suitable plastic material such as polypropylene is integral with the triggering arm 36 at the top of the triggering arm. The pin 50 is provided with head portions 52 at opposite ends. Each of the head portions 52 is disposed externally of the body portion 20 and the clamping member 22 at a position adjacent to the body portion and the clamping member. Rocker arms 54 are integral with the pivot pin 50 and are disposed on the pivot pin at positions internal to the watering cup and adjacent the internal side walls of the body portion 20 and the clamping member 22. In this way, the heads 52 and the rocker arms 54 are provided with a snug relationship with the walls of the body portion 20 and the clamping member 22. The vertical dimension of the rocker arm 54 along the inner wall of the cup may be greater than the horizontal dimension of the rocker arm along the inner wall of the cup.

The pin 50 is disposed in sockets 55 in the clamping member 22. The pin 50 rests on the rim 24 of the body portion 20 for pivotable movement of the pin, the triggering arm 36 and the rocker arm 54 relative to the body portion 24. Raised or detent portions 56 are provided on the inner surface of the body portion in spaced relationship to each other. Each of the rocker arms 54 is disposed between a pair of the raised or detent portions 56 so that its pivotable movement in opposite directions is limited by the raised portions.

The upper surface of the clamping member 22 is undercut at the rear end of the clamping member to define a ledge 62 near the upper end of the clamping member. The ledge 62 is curved downwardly as at 66, at the positions of the side wall of the body portion 20, to define a path for the flow of water downwardly in a swirling motion.

A tubular portion 70 is included in a valve generally indicated at 72. The tubular member is 70 provided at the rear end of the body portion 20 at a position just below the rim 24. A sleeve 74 is disposed on the tubular portion 70 and is sealed relative to the tube as by an 0-ring 76 disposed in a socket on the tubular portion. A rod 78 extends through the tubular portion 70 to a position adjacent the triggering arm 36. The rod 78 is provided with a splined configuration as at 80 to facilitate a flow of water through the valve 72 along the splines.

Barbs 82 are provided at the forward end of the rod 78 to limit the rearward movement of the rod relative to the body portion 20. The barbs 82 are tapered in the forward direction. The rod 78 is provided with an enlarged portion 84 at positions forward of the barbs 82. A sealing member 86 is disposed on the rod 78 at the rear end of the rod. The sealing member 86 co-operates with a tapered surface 88 on the rear end of the tubular portion 70 to close the valve 72 in the normal operation of the valve.

The valve 72 is normally in the closed position as a result of the action of the pressure of the water in the pipe 12. This pressure acts upon the sealing member 86 and forces the sealing member to the left in FIG. 5 against the tapered surface 88 on the rear end of the tubular member 70. During the time that the valve 72 is closed, the chicks 18 are able to drink water from the cup 10 since water is generally disposed in the basin portion 26 at a level corresponding to the position of the tongue portion 40.

When the chicken 18 desires water and the water level in the cup 10 is below the level of the tongue portion 40, the chicken pecks the tongue portion. This causes the triggering arm 36 to be pivoted against the rod 78 so that the rod is moved toward the right to open the valve 72, as illustrated in FIG. 5. Water then flows through the conduit 14, the pipe 16 and the valve 72 as illustrated in FIG. 5 by the arrows directed toward the left.

The water flowing through the valve 72 is directed against the central recess 45 defined by the hood portions 42. The water then flows outwardly and downwardly through the channel 46 to positions below the ledge 62 on the clamping member 22. The water then flows downwardly on the rear and side surfaces of the body portion 20 along the path defined by the curvature 66 in the ledge 62. The water accordingly flows in a path defining a swirling motion. The swirling movement of the water produces a cleansing action on the rear wall of the body portion 24 and carries particles of dirt and feed on the rear wall to the basin portion 26 at the bottom of the cup 10. By carrying particles of dirt and feed to the basin portion 26, the particles of dirt and feed are prevented from lodging in the valve 72 and jamming the valve in either the open or closed positions.

The proper operation of the valve 72 is also assured by the inclusion of other components in and on the cup. For example, the inclusion of the head portions 52 and the rocker arms 54 and the disposition of the head portions 52 on the external surfaces of the cup and the rocker arms on the internal surfaces of the body portion 24 prevent water from leaking from the cup. This is particularly true in view of the snug relationship between each head, the walls of the cup and the associated rocker arm. This synergistic effect appears to provide a significantly greater restriction on water leakage than is contributed by the individual relationship between the head and the external wall of the cup or between the rocker arm and the inner wall of the cup. This synergistic effect appears to be enhanced by forming the pin 50, the head portions 52 and the rocker arms 54 from a material which floats in water. By causing these elements to float, stresses on the cup at the positions of the sockets 54 in the cup for receiving the pin 50 may be relieved. This relief in stress acts to restrict the amount of water which can leak from the socket.

The construction of the valve 72 also enhances the operation of the cup 10 in providing water to the chicks 18. For example, the provision of the splines 80 on the rod 78 assures that the water will flow uniformly through the valve. The provision of the forwardly tapered barbs 82 further assures that the water will flow in a uniform manner and at a sufficiently low velocity to the central recess 44 in the triggering arm 36 so that the water will not splatter when it contacts the rear wall of the triggering arm 36.

The disposition of the pivot pin 50 in the clamping member 22 and on the rim 24 also enhances the performance characteristics of the cup. This causes the pivot pin 50 to be spaced a considerable distance above the tongue portion 40. Since the water in the cup is generally at the level of the tongue portion 40, the disposition of the pivot pin 50 at a position considerably above the tongue portion 40 normally prevents water from rising to the level of the pin and leaking from the cup through the area around the pin. This is facilitated by the considerable vertical height of the lever arm 38.

FIG. 2 illustrates an arrangement in the cup for directing from the cup water overflowing from the cup. In the arrangement shown in FIG. 2, an expanded rim 90 is provided on the clamping member 22 of the cup 10. The expanded rim 90 extends laterally and downwardly as at 92 from one side of the clamping member 22 at a position near, but below, the top of the cup (FIGS. 2, 3 and 7) so that any overflow of water from the cup to the ground will occur at positions displaced from the body portion 20 of the cup 10 and displaced from the pen 17. The lateral extension 92 is shaped to define gutter means having a channel 94.

At least one rib 96 is disposed at the bottom of the channel 94 at a position intermediate along the length of the channel. Preferably, a plurality of ribs 96 are provided at spaced positions along the length of the channel 94. The ribs 96 interrupt the flow of water along the channel so that the water reaching the end of the channel has a relatively low velocity. This low velocity inhibits any tendency for the water to be directed back toward the cup as the water flows from the channel toward the ground. A tongue 98 extends downwardly from the end of the channel 94. The tongue 98 also inhibits any tendency for the water to be directed back toward the cup as the water flows form the channel 94 toward the ground.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In combination for dissipating the thirst of fowl, a watering cup having a rear wall,
a triggering arm disposed in the cup and mounted for pivotal movement in accordance with the operation of the arm by the fowl,
valve means extending into the cup and operative between a normally closed position and an open position in accordance with the triggering of the triggering arm,
means for directing water through the valve means in the open position of the valve means,
means disposed on the triggering arm and responsive to the passage of the water through the valve means for directing the water in a swirling movement along the rear wall of the cup to clean the rear wall of the cup as the water flows to the bottom of the cup on the surface of the cup,
means disposed on at least one of the side walls of the cup for defining a pair of spaced detents, and
means disposable within the inner periphery of the cup between the pair of spaced detents and movable with the triggering arm for defining limits of pivotal movement of the triggering arm.

2. In the combination set forth in claim 1,
the directing means being disposed on the rear wall of the triggering arm for receiving the water passing through the valve means and for redirecting the water to the rear wall of the cup and the limiting means including an enlarged head portion movable with the triggering arm and disposed on the outer periphery of the cup.

3. In the combination set forth in claim 2,
the directing means being shaped to direct the water to the rear wall of the cup downwardly in a swirling motion and the triggering arm being mounted on a pin for pivotal movement with the pin and the limiting means including a rocker arm disposed on the pin within the inner periphery of the cup and the head being disposed on the pin within the outer periphery of the cup.

4. In the combination set forth in claim 3,
the triggering arm and the limiting means being made from a material having properties of floating in water.

5. In the combination set forth in claim 4, the rocker arm and the head defining close relationships with the walls of the cup.

6. In the combination set forth in claim 1,
a gutter portion extending outwardly and downwardly from one of the side walls of the cup at a position near the top of the side wall to receive overflows of water from the cup and
at least one rib disposed on the gutter portion to control the flow of water from the cup.

7. In the combination set forth in claim 6,
a tongue extending downwardly from the gutter portion at the outer end of the gutter portion.

8. In the combination set forth in claim 7,
the triggering arm being made from a material having properties of floating in water to limit the load of the triggering arm on the cup.

9. The combination set forth in claim 8 wherein the vertical dimension of the limiting means is greater than the horizontal dimension of the limiting means.

* * * * *